United States Patent
Yang et al.

(10) Patent No.: US 8,122,463 B2
(45) Date of Patent: Feb. 21, 2012

(54) ELECTROSTATIC DISCHARGE PROTECTION DEVICE FOR OPTICAL DISK DRIVE

(75) Inventors: Li-Li Yang, Taoyuan (TW);
Hsien-Chung Ou, Taoyuan (TW);
Chen-Fu Chang, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 1013 days.

(21) Appl. No.: 12/076,142

(22) Filed: Mar. 14, 2008

(65) Prior Publication Data

US 2008/0172684 A1   Jul. 17, 2008

(51) Int. Cl.
*G11B 33/14* (2006.01)
*G11B 17/03* (2006.01)

(52) U.S. Cl. ....................... 720/650; 720/613

(58) Field of Classification Search .......... 720/601–602, 720/606–607, 609–613, 648, 650, 659, 663–667
See application file for complete search history.

(56) References Cited

U.S. PATENT DOCUMENTS

| | | | | |
|---|---|---|---|---|
| 5,808,996 A | * | 9/1998 | Aoyama | 720/651 |
| 6,181,663 B1 | * | 1/2001 | Kakuta et al. | 720/610 |
| 6,947,355 B2 | * | 9/2005 | Hong et al. | 369/30.27 |
| 2003/0072243 A1 | * | 4/2003 | Yeh et al. | 369/75.2 |
| 2003/0117928 A1 | * | 6/2003 | Choi et al. | 369/75.2 |

* cited by examiner

*Primary Examiner* — Nathan Danielsen
(74) *Attorney, Agent, or Firm* — Bacon & Thomas, PLLC

(57) ABSTRACT

An ESD protection device for a disk drive comprises a guide at two inner sides of the disk drive. A conductive sponge, one end contacting the case and the other protruding end contacting one of two conductive rails, is disposed in one guide. A hook is formed at one end, jutting out of the disk drive, of the rail. The rails support two sides of the tray, having electric elements disposed thereon and its bottom being covered by a conductive traverse cover, sliding. A conductive elastic stopper disposed at the bottom tray has an indentation formed at the front end to position the hook on the indentation's moving path, a contact part bent to electronically connect to the cover next to the indentation, and a sliding part formed at the rear end by protruding upwards to electronically connected to the rail, to electronically connect to the cover and the rail.

18 Claims, 4 Drawing Sheets

ELECTROSTATIC DISCHARGE PROTECTION DEVICE FOR OPTICAL DISK DRIVE

BACKGROUND OF THE INVENTION

1. Field of the Invention

The invention relates in general to an optical disk drive, and more particularly to an electrostatic discharge protection device for eliminating static electricity from users so as not to harm precision electrical components in an optical disk drive.

2. Description of the Related Art

In the process of operating an optical disk drive having precision electrical components, users have to contact the optical disk drive. Thus, the static electricity form the users accumulates in conductors or rushes everywhere through the conductors in the optical disk drive. Once the static electricity is transmitted to the precision electrical components, the electrical components are destructible easily.

FIG. 1 is a perspectively top view of the inside of a conventional optical disk drive 10. FIG. 2 is a perspectively bottom view of the inside of the conventional optical disk drive 10. A metallic case 11 has a hollow space, and two fixing guides 111 made of plastic material are disposed at two sides of the case 11 respectively. A metallic rail 112 is slidably disposed in each fixing guide 111. One end of the rail 112 is obstructed by an obstructive lump 113 of the case 11, and the other end of the rail 112 supports two sliding sticks 121 of a tray 12 at two sides. A hook 114 is disposed in one of the rail 112 for blocking a blocking lump 122 located at the rear end of the tray 12 and restricting the distance that the tray 12 jutting out of the case 11. Thus, the tray 12, comprised of plastic, could slide inwards and outwards the case 11 and jut out of the case 11 completely. Moreover, the precision electrical components, such as a spindle motor 13 for rotating a disk or a pickup head 14, are disposed on the tray 12, and the bottom of the tray 12 is covered and protected by a traverse cover 15, which is metal. The front end of the tray 12 connects with a panel 16 having an eject key 17. One end of a flexible flat cable 18 of a print circuit board connects with a main circuit board 19 and is disposed close to the inner surface of the case 11. The other end of the flexible flat cable 18 is movable, connects with the rear end of the tray 12, and is electronically connected to the traverse cover 15. One circuit line of the flexible flat cable 18 and the case 11 are grounded.

When users eject disks by pressing the eject key 17, the static electricity form the users is transmitted to the traverse cover 15 which is metal via the gap between the panel 16 and the eject key 17. Or, when users directly touch the optical disk drive 10, the static electricity is directly transmitted to the traverse cover 15 which is metal, and then the static electricity is eliminated by being transmitted from the flexible flat cable 18 to the case 11. However, though little static electricity can be eliminated, a great quantity of unexpected static electricity may not be eliminated rapidly due to the small size of the flexible flat cable 18. In that situation, the accumulation of static electricity causes destruction. Additionally, if a great quantity of static electricity passes through the flexible flat cable 18 which is used for transmitting signal and data, the signal and data being transmitted at the same time are interfered easily. Consequently, the reliability of the optical disk drive is affected. Furthermore, the hook 114 disposed in the rail 112 which is comprised of thin metal harms the blocking lump 122 which is comprised of plastic when the hook 114 obstructs the blocking lump 122, especially when suffering a great bump. Accordingly, the tray may lock with the rail and thus be unable to eject disks and insert disks normally. Hence, the problems of the electrostatic discharge protection and the breaking of the tray in the conventional optical disk drive need to be solved.

SUMMARY OF THE INVENTION

It is therefore an object of the invention to provide an electrostatic discharge protection device for an optical disk drive, in which a conductive elastic stopper electrically connected to a traverse cover and a rail is utilized for grounding the static electricity through the rail, so as to avoid the static electricity interfering the transmission of signal and data.

It is therefore another object of the invention to provide an electrostatic discharge protection device for an optical disk drive, that enhances the breaking strength when suffering a bump by utilizing an elastic stopper as the blocking lump of the optical disk drive, so as to increase the reliability of the optical disk drive.

It is therefore another object of the invention to provide an electrostatic discharge protection device for an optical disk drive, wherein the static electricity is grounded through the two sides of the rails and the accumulative static electricity on the rails is guided to be eliminated, so as to increase the efficacy of eliminating static electricity.

According to a first aspect of the present invention, an electrostatic discharge protection device for an optical disk drive is provided. A guide is fixed at two sides of the inner case respectively. A conductive sponge is disposed in one of the guides. One end of the conductive sponge contacts the case, and the other end protruding from the guide contacts one of the conductive rails. A hook is formed at one end, which juts out of the optical disk drive, of the rail. The rails support two sides of the tray sliding. Electric elements are disposed on the tray which its bottom is covered and protected by a conductive traverse cover. An elastic stopper, being conductive, is disposed at the bottom of the tray and has an indentation at the front end for positioning the hook on the moving path of the indentation. A contact part located at the side of the indentation is bent to electronically connect to the traverse cover. The rear end of the elastic stopper protrudes upwards to form a sliding part electronically connected to the rail, so as to electronically connect the traverse cover and the rail.

According to a second aspect of the present invention, another electrostatic discharge protection device for an optical disk drive is provided. The electrostatic discharge protection is disposed in a case of the optical disk drive. The bottom of a tray having electric elements disposed thereon is covered and protected by a conductive traverse cover. Two rails, being conductive and including a first rail and a second rail, are disposed at two sides of the case to support the tray sliding. A hook is formed at the end, where juts out of the optical disk drive, of the first rail. A first elastic stopper, being conductive, is electrically connected to the traverse cover and the first rail having the hook. An indentation is formed at the front end of the elastic stopper to position the hook on the moving path of the indentation. A second conductive elastic stopper is electrically connected to the traverse cover and the second rail.

DETAILED DESCRIPTION OF THE INVENTION

In order to achieve the purpose mentioned above, a preferred embodiment is detailedly described below. The invention will become apparent from the following detailed description of the preferred but non-limiting embodiments. The following description is made with reference to the accompanying drawings.

Figure 1:
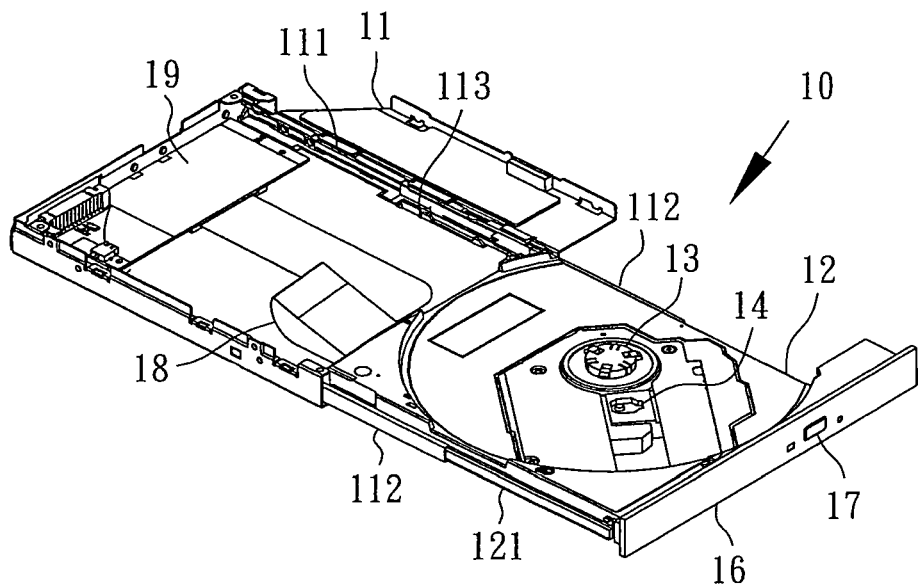
FIG. 1 is a perspective view of the inside of a conventional optical disk drive.
Figure 2:
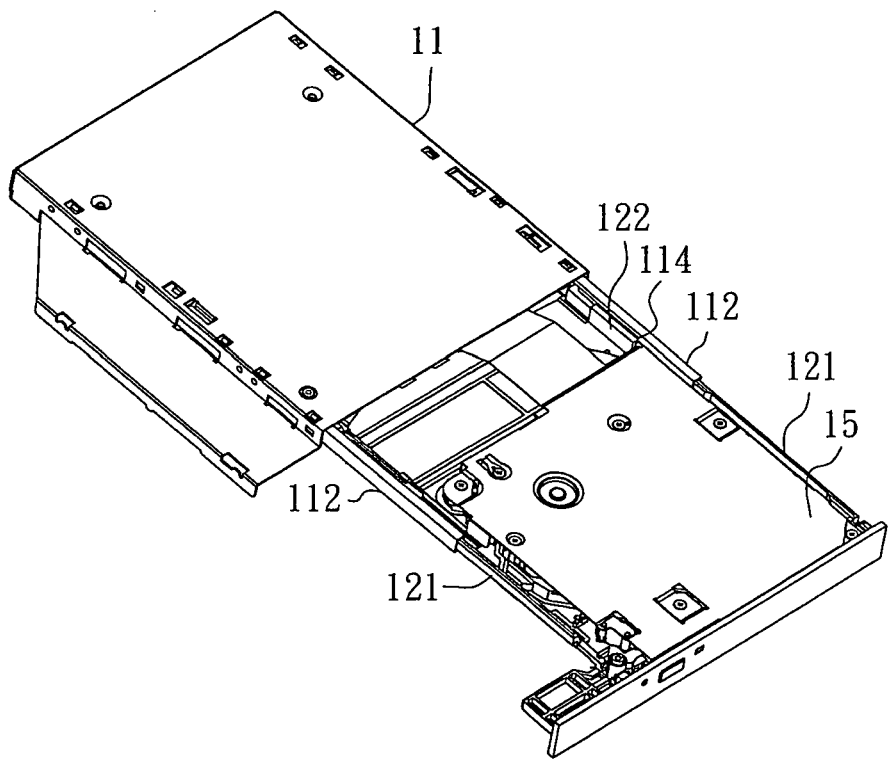
FIG. 2 is a perspective view of the reverse side of the conventional optical disk drive.
Figure 3:
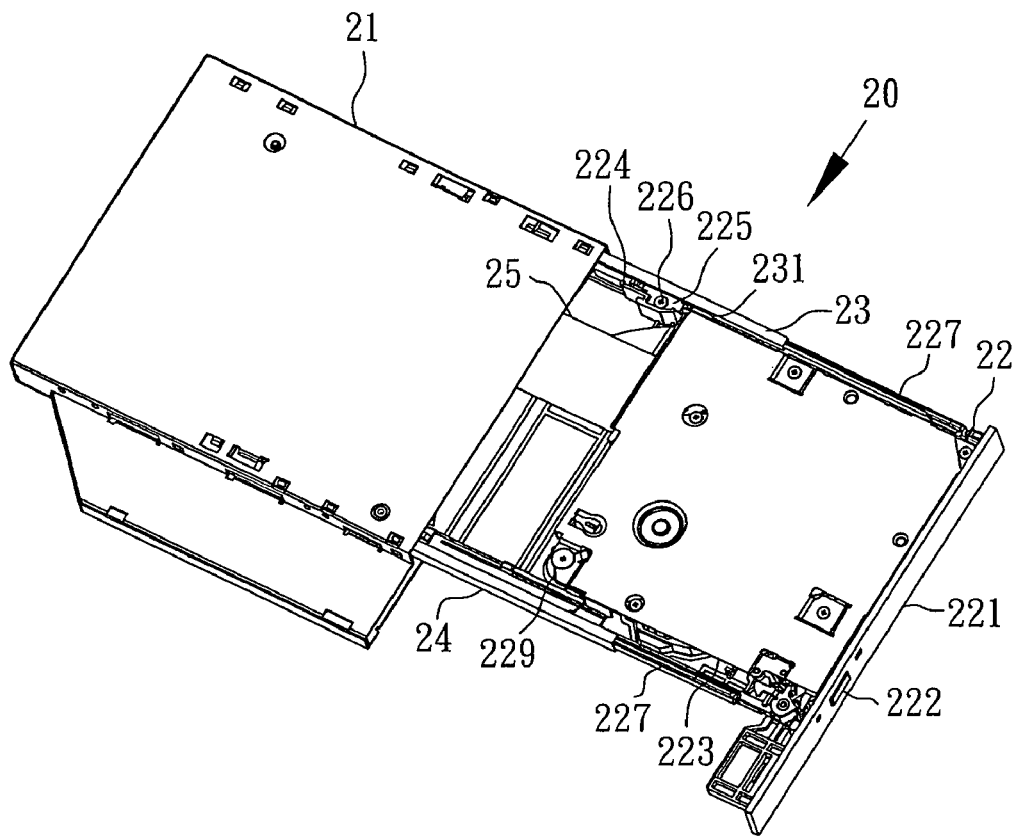
FIG. 3 is a perspective view of an electrostatic discharge protection device for an optical disk drive according to a preferred embodiment of the invention.

Referring to FIG. 3, a perspective view of an electrostatic discharge protection device for an optical disk drive 20 according to a preferred embodiment of the invention is shown. The optical disk drive 20 includes a case 21, a tray 22, a first rail 23, a second rail 24 and a flexible flat cable 25. The first rail 23 and the second rail 24 are disposed at two sides of the case 21 to support the tray 21, and the tray 21 is slidable with respect to the case 21 inwards and outwards. The flexible flat cable 25 connected with the tray 22 moves with the tray 22 and transmits data and signal.

Figure 4:
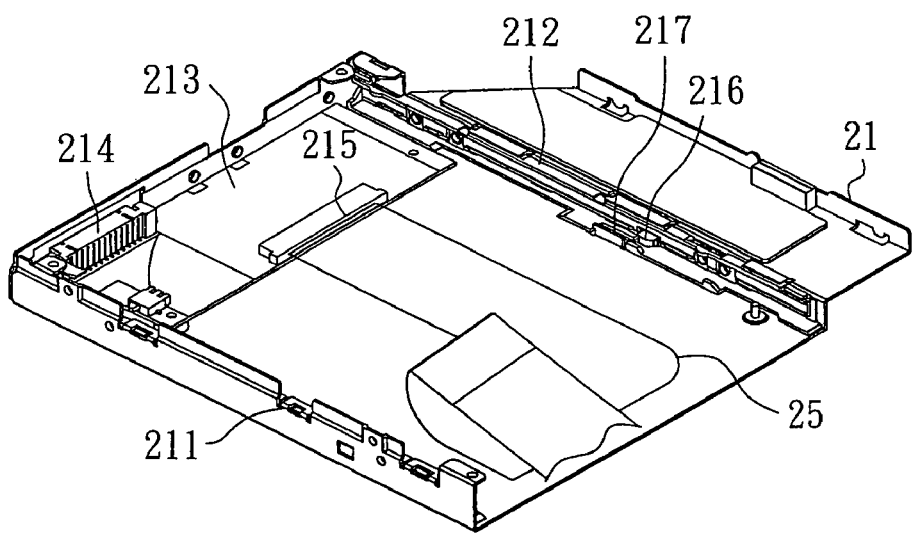
FIG. 4 is a perspective view of the inner structure of the case with omitting a part.

Referring to FIG. 4, a perspective view of the inner structure of the case 21 with omitting a part is shown. The case 21 is made of conductive material, such as metal. A first guide 211 and a second guide 212 are firmly disposed at two inner sides of the case 21 respectively. The first guide 211 and the second guide 212 are plastic. A conductive sponge 216 is disposed in each guide. One end of the conductive sponge 216 contacts with the case 21, and the other end of the conductive sponge 216 protrudes from the first guide 211 and the second guide 212. An obstructive lump 217 is respectively disposed next to the first guide 211 and the second guide 212 of the case 21. A main circuit board 213 is disposed at the rear side of the case 21. The rear end of the main circuit board 213 is connected to an outer connector 214 as a connecting interface with the external circuits. The front end of the main circuit board 213 is connected to an inner connector 215 for connecting with one end of the flexible flat cable 25. A half flexible flat cable 25 leans against the bottom surface of the case 21 along the direction of the slot of the inner connector 215, and another half flexible flat cable 25 is movable.

Please also refer to FIG. 3 at the same time. The first rail 23 and the second rail 24 are made of conductive material, such as metal. The first rail 23 and the second rail 24 are disposed in the first guide 211 and the second guide 212 respectively so as to be capable of moving along the rails unrestrictedly, and compress the conductive sponge 216 to form an electrical connection. One end of the first rail 23 and one end of the second rail 24 are obstructed by the obstructive lump 217 (not shown), and the other end of the first rail 23 and the other end of the second rail 24 are capable of jutting out of the case 21. A hook 231 is formed near the other end of the first rail 23 which is capable of jutting out of the case 21.

Furthermore, the main body of the tray 22 is plastic. The front end of the tray 22 is connected to a panel 221 on which an eject key 222 is disposed. The bottom of the tray 22 is covered with a traverse cover 223 being made of conductive material, such as metal. The front end of the traverse cover 223 is connected with the panel 221 and close to the eject key 222. Two sliding sticks 227 extending from two sides of the main body of the tray 22 are disposed in and supported by the first rail 23 and the second rail 24 so as to allow the tray 22 to be jutted out of the case 21. The rear side of the tray 22 is connected with the underneath of movable end of the flexible flat cable 25. At the bottom of the tray 22, a fixing pillar 224 is disposed close to the rear end of the traverse cover 223 and the first rail 23. A first elastic stopper 225 is fixed at the fixing pillar 224 by utilizing a screw 226.

Figure 5:
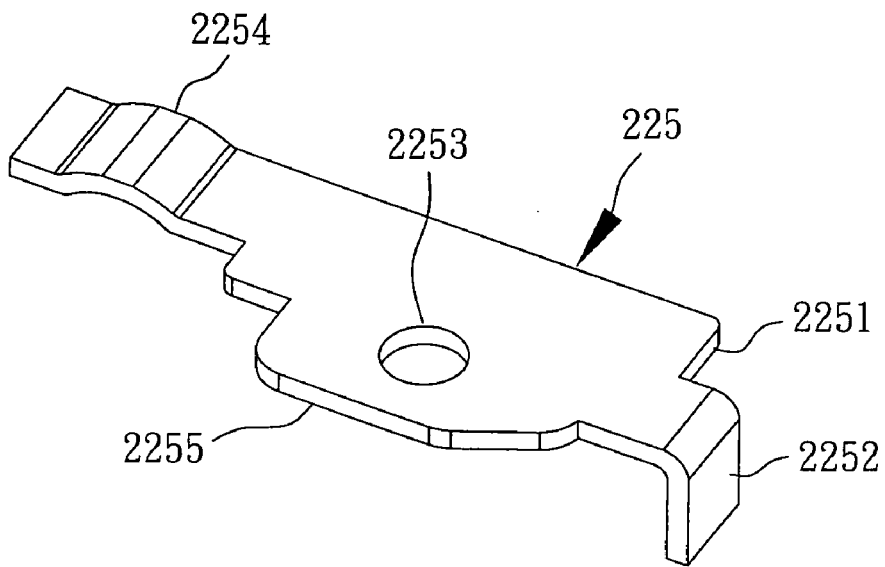
FIG. 5 is a perspective view of the first elastic stopper.
Figure 6:
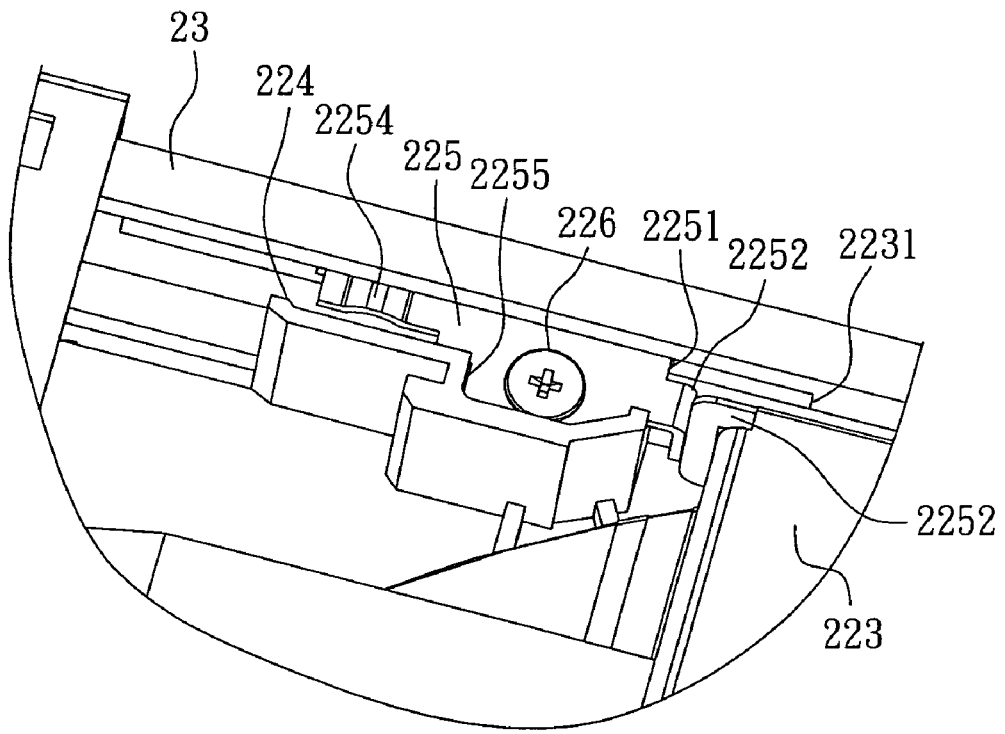
FIG. 6 is a magnified figure of partial combination of the first elastic stopper.

Referring to FIG. 5, a perspective view of the first elastic stopper 225 is shown. The main body of the first elastic stopper 225 is a flake of conductive material, such as metal. An indentation 2251 is formed at the front end of the first elastic stopper 225, and the portion next to the indentation 2251 is bent vertically downward to form a contact part 2252. The middle of the first elastic stopper 225 is pierced through to form a screw hole 2253 and the rear end of the first elastic stopper 225 protrudes upwards to form a sliding part 2254. The shape of a fixing side 2255 of the first elastic stopper 225 conforms to the shape of the fixing pillar 224. Referring to FIG. 6, a magnified figure of partial combination of the first elastic stopper in FIG. 4 is shown. When the first elastic stopper 225 is fixed firmly at the fixing pillar 224 by piercing through the screw hole 2253 with the screw 226, the fixing side 2255 of the first elastic stopper 225 is wedged into the fixing pillar 224. Thus, the first elastic stopper 225 renders incapability of rotating, so as to enhance the braking efficacy of the first elastic stopper 225. Meanwhile, the contact part 2252 at the front end of the first elastic stopper 225 is against an extending part 2231 at the rear end of the traverse cover 223 to result in being electronically connected. The side of the first elastic stopper 225 opposite to the contact part 2252 extends into the first rail 23 to position the hook 231 on the moving path of the indentation 2251, for obstructing the indentation 2251 and avoiding the tray 22 being deviate from the case 21. The sliding part 2254 protruding upwards from the rear end of the first elastic stopper 225 is propped against and therefore electronically connected to the first rail 23. The traverse cover 223 and the first rail 23 become a conductive loop by the connection of the first elastic stopper 225.

Figure 7:
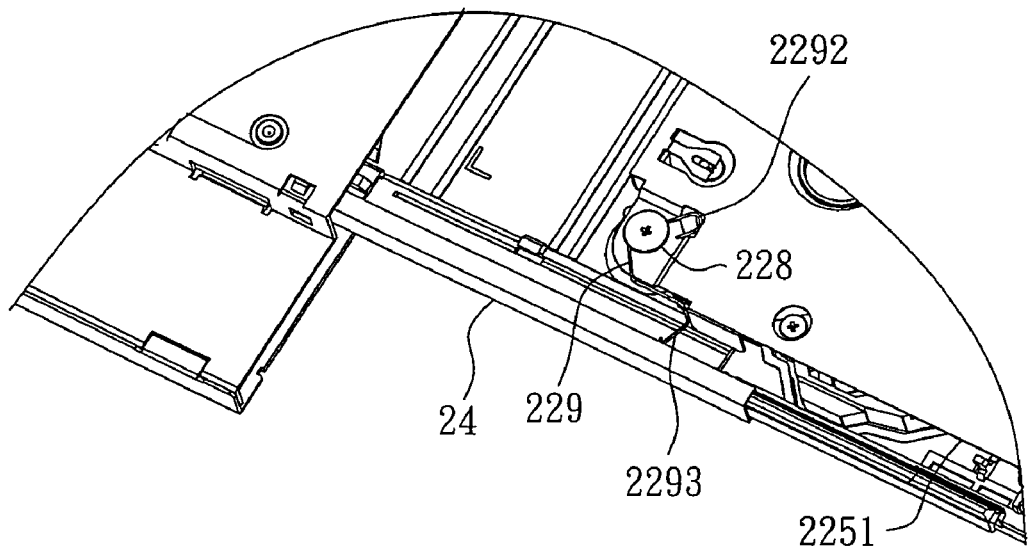
FIG. 7 is a magnified figure of a second rail.
Figure 8:
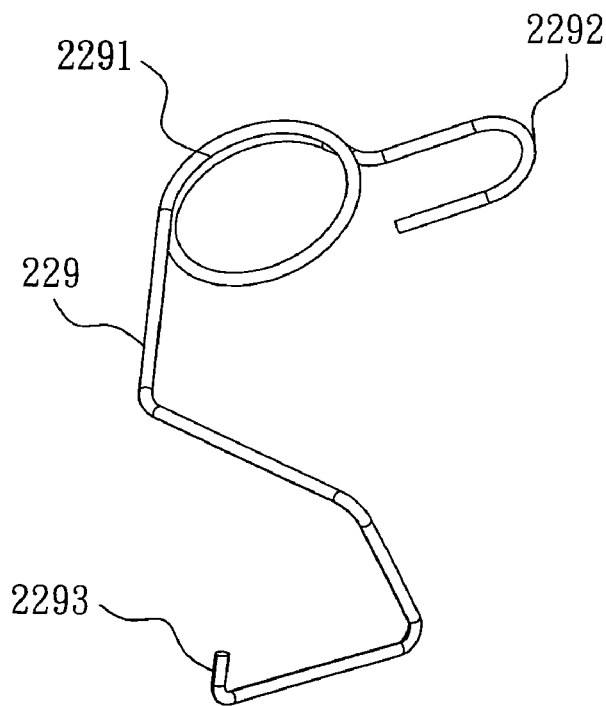
FIG. 8 is a perspective view of the second elastic stopper.

Additionally, referring to FIG. 7, a magnified figure of a second rail 24 in FIG. 3 is shown. A second elastic stopper 229 is fixed firmly at the rear corner, which is close to the second rail 24, of the traverse cover 223 by utilizing a fixing screw 228. Please refer to FIG. 8 at the same time, a perspective view of the second elastic stopper 229 is shown. The second elastic stopper 229 is a twisty bar spring of conductive material, such as metal. The middle of the second elastic stopper 229 is twisted to form a fixing hole 2291. The second elastic stopper 229 is fixed firmly on the traverse cover 223 by the fixing screw 228 piercing through the fixing hole 2291. One end of the second elastic stopper 229 is bent to form an U-shape end 2292 for wedging into and being electrically connected with the traverse cover 223. The other end of the second elastic stopper 229 is formed an elastic clasp 2293 to prop against and be electrically connected with the second rail 24. The traverse cover 223 and the second rail 24 become another conductive loop by the connection of the second elastic stopper.

Please refer to FIG. 3 and FIG. 4 at the same time, when users eject disks by pressing the eject key 222, the static electricity from the users is transmitted to the traverse cover 223 via the gap between the panel 221 and the eject key 222. Then, the static electricity can be grounded and eliminated by the conductive loop of transmitting from the extending part 2231 at the rear end of the traverse cover 223 to the contact part 2252 of the first elastic stopper 225, and then from the first rail 23 propped against the sliding part 2254 to the conductive sponge 216, then to the case 21. Or, the static electricity can be grounded and eliminated by the conductive loop of transmitting from the U-shape end 2292 of the second elastic stopper 229 to the second rail 24 propped against the elastic clasp 2293, and then from the conductive sponge 216 to the case 21. Thus, the electrostatic discharge protection device for an optical disk drive of the invention is achieved.

In the electrostatic discharge protection device for an optical disk drive according to the above-described preferred embodiment of the invention, at least a conductive elastic stopper is electrically connected to the traverse cover and the rails, so that the static electricity can be grounded via the rails. Thus, the static electricity can be eliminated without passing through the flexible flat cable, so as to avoid the static electricity interfering the transmission of signal and data. In addition, a great quantity of static electricity can be eliminated due to more circuit lines of the flexible flat cable. Furthermore, in addition to being electrically connected to the traverse cover and the rails, the elastic stopper of the present invention can also be the blocking lump of the tray for enhancing the braking efficacy when the tray suffers a bump because of its metallic elasticity and toughness. Thus, it is capable of avoiding the deviate and harm of the tray, so as to eject disks and insert disks normally, hence the reliability of the optical disk drive is increased. Meanwhile, the electrostatic discharge protection device of the invention makes the rails at two sides become a link of the static electricity eliminating loop, hence the advantage of easy touch in operating is achieved. Besides, the accumulated static electricity can be grounded and eliminated by the metallic rails isolated by the plastic guides and the tray, hence the harm of the precision electrical components in the optical disk drive can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electrostatic discharge protection device for an optical disk drive, comprising:
    a tray, wherein electric components are disposed on the tray, and the bottom of the tray is covered by a conductive traverse cover;
    two rails being made of conductive material and supporting the tray so as to allow the two sides of the tray to be slid thereon;
    at least an elastic stopper being made of conductive material and being electrically connected to the traverse cover and at least one of the rails; and
    a case made of conductive material that is grounded, wherein each two inner sides of the case has a guide respectively so as to allow the two rails to be slid thereon, the guides are made of plastic material, the rails are electrically connected to the elastic stopper slide thereon, and each guide comprises a conductive sponge disposed therein, one end of the conductive sponge contacting the case, and another end of the conductive sponge that protrudes from the guide contacting the rail.

2. The electrostatic discharge protection device for an optical disk drive according to claim 1, wherein a fixing pillar is protrusively disposed at the bottom of the tray close to the rear end of the traverse cover and the rail which is electrically connected to the traverse cover by the elastic stopper so as to fix the elastic stopper.

3. The electrostatic discharge protection device for an optical disk drive according to claim 2, wherein the middle of the elastic stopper is pierced through to form a screw hole, and the shape of a fixing side of the elastic stopper conforms to the shape of the fixing pillar.

4. The electrostatic discharge protection device for an optical disk drive according to claim 1, wherein an indentation is formed at the front end of the elastic stopper, and a contact part located beside the indentation is bent to electrically connect to the traverse cover.

5. The electrostatic discharge protection device for an optical disk drive according to claim 4, wherein an extending part extending from the rear end of the traverse cover is electrically connected to the contact part of the elastic stopper.

6. The electrostatic discharge protection device for an optical disk drive according to claim 4, wherein a hook is formed near the end of the electrically connected rail which juts out of the optical disk drive.

7. The electrostatic discharge protection device for an optical disk drive according to claim 6, wherein one side of the elastic stopper extends into the rail to position the hook on the moving path of the indentation.

8. The electrostatic discharge protection device for an optical disk drive according to claim 1, wherein the rear end of the elastic stopper protrudes upwards to form a sliding part electrically connected to the rail.

9. The electrostatic discharge protection device for an optical disk drive according to claim 1, wherein the elastic stopper is a twisty bar spring, one end of the elastic stopper is electrically connected to the traverse cover, and the other end of the elastic stopper is electrically connected to the rail.

10. The electrostatic discharge protection device for an optical disk drive according to claim 9, wherein a fixing hole is formed by twisting the middle of the elastic stopper, the elastic stopper is fixed on the traverse cover, one end of the elastic stopper is formed an U-shape to wedge into the traverse cover, and the other end of that is formed as an elastic clasp to prop against the rail.

11. The electrostatic discharge protection device for an optical disk drive according to claim 9, wherein the elastic stopper is fixed at the corner of the traverse cover and close to the rail.

12. An electrostatic discharge protection device for an optical disk drive, wherein the electrostatic discharge protection device is disposed in a case of the optical disk drive, the electrostatic discharge protection device for an optical disk drive comprising:
    a tray, wherein electric components are disposed on the tray, and the bottom of the tray is covered by a conductive traverse cover;
    two rails being made of conductive material, the two rails comprising a first rail and a second rail disposed at two sides of the case and supporting the tray so as to allow the tray to be slid thereon, wherein a hook is formed at one end of the first rail which juts out of the optical disk drive;
    a first elastic stopper being conductive material and electrically connected to the traverse cover and the first rail, wherein an indentation is formed at the front end of the elastic stopper to position the hook on the moving path of the indentation; and
    a second elastic stopper being made of conductive material and electrically connected to the traverse cover and the second rail,
    wherein the case is made of conductive material that is grounded, each two inner sides of the case has a guide respectively so as to allow the two rails to be slid thereon, each guide is made of plastic material, a conductive sponge is disposed in each guide, one end of the conductive sponge contacts the case, and another end of the conductive sponge that protrudes from the guide contacts the rails respectively.

13. The electrostatic discharge protection device for an optical disk drive according to claim 12, wherein a fixing pillar is protrusively disposed at the bottom of the tray close to the rear end of the traverse cover and the rail comprising the hook so as to fix the first elastic stopper.

14. The electrostatic discharge protection device for an optical disk drive according to claim 13, wherein the shape of a fixing side of the first elastic stopper conforms to the shape of the fixing pillar, an indentation is formed at the front end of the first elastic stopper, the moving path of the indentation passes through the hook, and a contact part located beside the indentation is bent to electrically connect to the traverse cover.

15. The electrostatic discharge protection device for an optical disk drive according to claim 13, wherein the rear end of the first elastic stopper protrudes upwards to form a sliding part electrically connected to the rail.

16. The electrostatic discharge protection device for an optical disk drive according to claim 12, wherein the second elastic stopper is a twisty bar spring, one end of the second elastic stopper is electrically connected to the traverse cover, and the other end of the second elastic stopper is electrically connected to the second rail.

17. The electrostatic discharge protection device for an optical disk drive according to claim 16, wherein a fixing hole formed by twisting the middle of the second elastic stopper is fixed on the traverse cover, one end of the second elastic stopper is formed an U-shape to wedge into the traverse cover, and the other end of the second elastic stopper is formed an elastic clasp to prop against the second rail.

18. The electrostatic discharge protection device for an optical disk drive according to claim 17, wherein the second elastic stopper is disposed nearby the second rail on the traverse cover.

\* \* \* \* \*